(12) United States Patent
Moshchuk et al.

(10) Patent No.: US 9,731,755 B1
(45) Date of Patent: Aug. 15, 2017

(54) PREVIEW LATERAL CONTROL FOR AUTOMATED DRIVING

(71) Applicant: GM GLOBAL TECHNOLOGY OPERATIONS LLC, Detroit, MI (US)

(72) Inventors: Nikolai K. Moshchuk, Grosse Pointe, MI (US); Shih-Ken Chen, Troy, MI (US); Bakhtiar B. Litkouhi, Washington, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/044,851

(22) Filed: Feb. 16, 2016

(51) Int. Cl.
*B62D 6/00* (2006.01)
*G05D 1/02* (2006.01)
*G05D 1/00* (2006.01)

(52) U.S. Cl.
CPC ............. *B62D 6/00* (2013.01); *G05D 1/0088* (2013.01); *G05D 1/021* (2013.01)

(58) Field of Classification Search
CPC ..................................... G01P 3/38; B62D 6/00
See application file for complete search history.

(56) References Cited

U.S. PATENT DOCUMENTS

| | | | | |
|---|---|---|---|---|
| 7,630,806 B2* | 12/2009 | Breed | ................ | B60R 21/0134 180/273 |
| 8,190,316 B2* | 5/2012 | Kaji | ..................... | B63H 21/213 318/588 |
| 8,543,261 B2* | 9/2013 | Anderson | ............. | B60W 30/09 701/3 |
| 8,634,980 B1* | 1/2014 | Urmson | .................. | G05D 1/00 701/23 |
| 8,849,515 B2 | 9/2014 | Moshchuk et al. | | |
| 8,903,607 B2 | 12/2014 | Lee et al. | | |
| 9,082,239 B2* | 7/2015 | Ricci | ....................... | B60Q 1/00 |
| 9,488,492 B2* | 11/2016 | Samarasekera | .... | G06K 9/00637 |
| 9,513,632 B1* | 12/2016 | Gordon | ............... | G05D 1/0061 |
| 2008/0091318 A1 | 4/2008 | Deng et al. | | |
| 2013/0231779 A1* | 9/2013 | Purkayastha | ......... | B25J 9/1697 700/259 |
| 2013/0238183 A1* | 9/2013 | Goulding | ............. | B62D 57/024 701/26 |

(Continued)

*Primary Examiner* — Angela Ortiz
*Assistant Examiner* — Alex C Dunn
(74) *Attorney, Agent, or Firm* — John A. Miller; Miller IP Group, PLC

(57) ABSTRACT

A method for providing vehicle lateral steering control. The method includes providing a mathematical model of vehicle dynamics that includes a state variable, a steering control variable and a future road disturbance factor that defines the upcoming road curvature, banks and slopes of the roadway. The method determines an optimal steering control signal that includes a feedback portion and a feed-forward portion, where the feed-forward portion includes the road disturbance factor. The method determines a state variable and a control variable for the current roadway curvature, bank and slope for stationary motion of the vehicle for constant speed, yaw rate and lateral velocity. The method then introduces a new state variable and control variable for dynamic vehicle motion for variable speed, yaw rate and lateral velocity that is a difference between the state and control variables for predicted future times and the steady state variables.

21 Claims, 2 Drawing Sheets

(56) References Cited

U.S. PATENT DOCUMENTS

| | | | |
|---|---|---|---|
| 2014/0253722 A1* | 9/2014 | Smyth | G01P 3/38 348/135 |
| 2015/0158528 A1 | 6/2015 | Moshchuk et al. | |
| 2015/0224987 A1* | 8/2015 | Tachibana | G08G 1/166 701/1 |
| 2016/0082964 A1* | 3/2016 | Chunodkar | B60W 30/18 701/70 |
| 2016/0202670 A1* | 7/2016 | Ansari | G05B 13/048 700/45 |

* cited by examiner

PREVIEW LATERAL CONTROL FOR AUTOMATED DRIVING

BACKGROUND OF THE INVENTION

Field of the Invention

This invention relates generally to a system and method for providing lateral steering control assist for lane centering, lane keeping, lane changing, collision imminent steering, etc. in an autonomously driven or semi-autonomously driven vehicle and, more particularly, to a system and method for providing lateral steering control assist for lane centering, lane changing, lane keeping, lane following, a collision imminent steering, etc. in an autonomously driven or semi-autonomously driven vehicle, where the system and method provide a preview of upcoming curved, banked and/or sloped roadways.

Discussion of the Related Art

The operation of modern vehicles is becoming more autonomous, i.e., the vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems providing automatic braking without driver intervention to avoid rear-end collisions. As vehicle systems improve, they will become more autonomous with the goal being a completely autonomously driven vehicle. For example, future vehicles probably will employ autonomous systems for lane changing, passing, turns away from traffic, turns into traffic, etc.

Collision avoidance systems are known in the art for providing automatic braking and/or steering of a subject vehicle to avoid a slower or stopped object in front of the subject vehicle in the event that the vehicle driver does not take evasive action. Known collision avoidance systems provide warnings to the vehicle driver and depending on whether the driver takes evasive action, may provide automatic braking and/or automatic steering. If the system determines that automatic steering is necessary to avoid a collision, the system must calculate a safe steering path for the subject vehicle to provide the steering control. Some of those systems are able to detect lane markings so as to calculate the steering path of the subject vehicle to make a lane change for collision avoidance purposes. Those collision avoidance systems also provide steering commands that cause the subject vehicle to follow the calculated steering path to provide the vehicle steering.

The object detection sensors for these types of systems may use any of a number of technologies, such as short range radar, long range radar, cameras with image processing, laser or lidar, ultrasound, etc. The object detection sensors detect vehicles and other objects in the path of a subject vehicle, and the application software uses the object detection information to provide warnings or take actions as appropriate. The warning can be a visual indication on the vehicles instrument panel or in a head-up display (HUD), and/or can be an audio warning or other haptic feedback device, such as seat shaking. In many vehicles, the object detection sensors are integrated directly into the front bumper or other fascia of the vehicle.

Various systems are known in the art for autonomously driven or semi-autonomously driven vehicles that employ suitable controllers, sensors, steering actuators, etc. that provide automatic vehicle steering for one or more of lane centering, lane keeping, lane changing, collision avoidance, etc. For example, U.S. Pat. No. 8,903,607 issued Dec. 2, 2014 to Lee et al., titled, Lane Tracking System With Active Rear-Steer, discloses a lane tracking system that determines a desired course of a vehicle along a roadway, estimates a trajectory of the vehicle based on sensed vehicle motion, computes an error between the determined desired course and the estimated trajectory, and provides a front steering torque command to a front steering controller and a rear steering torque command to a rear steering controller to minimize the error.

U.S. Pat. No. 8,849,515 issued Sep. 30, 2014 to Moshchuk et al., titled, Steering Assist in Driver initiated Collision Avoidance Maneuver, discloses a collision avoidance system that identifies a collision threat, calculates an optimal collision avoidance path, and provides a steering assist torque for steering the vehicle along the path.

U.S. Pat. No. 8,170,739 issued May 1, 2012 to Lee, titled, Path Generation Algorithm for Automated Lane Centering and Lane Changing Control System, discloses a system for providing path generation for automated lane centering and/or lane keeping purposes. The system detects lane markings on the roadway and generates a desired vehicle path that maintains the vehicle in the lane.

U.S. Patent Application Publication No. 2015/0158528 to Moshchuck et al., titled, Collision Avoidance Control Integrated with EPS Controller, discloses a model predictive control (MPC) that employs a six-dimensional vehicle motion model including a combination of a one-track linear bicycle model and a one-degree of freedom steering column model to model the vehicle steering to provide a torque overlay command for steering assist.

The known systems generally referred to above for providing lane centering, lane keeping, lane following, collision imminent steering, steering angle assist, etc. for autonomously and semi-autonomously driven vehicles typically use fused sensor data available at any particular point in time. However, upcoming road changes, such as curves, banks, slopes, etc., in the roadway are typically not fully processed in the control architecture for these systems. For example, segments of a roadway that have sudden horizontal curvature changes are the most challenging situation for autonomously driven vehicle control. The performance requirements for active safety features in these types of system impose a strict limit on the lateral deviation on a curved roadway.

SUMMARY OF THE INVENTION

The present disclosure describes a system and method for providing lateral steering control in an autonomously or semi-autonomously driven vehicle for lane centering, lane changing, lane following, collision imminent steering, etc., and includes providing a preview of upcoming road curvature, banks and slopes. The method includes providing a mathematical model of vehicle dynamics that includes a state variable, a steering control variable and a future road disturbance factor that defines the upcoming road curvature, banks and slopes of the roadway. The method determines a steering control goal that reduces a difference between a current vehicle path and a desired vehicle path and determines an optimal steering control signal that provides the steering control goal and that includes a feedback portion and a feed-forward portion, where the feed-forward portion includes the road disturbance factor. The method determines a state variable and a control variable for the current roadway curvature, bank and slope for stationary motion of the vehicle for constant speed, yaw rate and lateral velocity. The method then introduces a new state variable and control variable for dynamic vehicle motion for variable speed, yaw rate and lateral velocity that is a difference between the state and control variables for predicted future times and the steady state variables.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method that provide lateral steering control assist in an autonomously driven or semi-autonomously driven vehicle including providing a preview of upcoming road curvature, slopes and banks is merely exemplary in nature, and is in no way intended to limit the invention or its applications or uses. For example, the system and method of the invention may have application in other industries and for other types of conveyances.

As will be discussed in detail below, the present invention proposes a system and method for providing lateral steering control assist for vehicle steering in an autonomously or semi-autonomously driven vehicle that may be employed for lane centering, lane changing, lane following, collision imminent steering, etc., where the system and method provide preview information of upcoming road curves, banks and/or slopes. The system and method disclosed herein may incorporate one or more of the algorithms or processes discussed in the references above for detecting a vehicle lane, objects, etc., determining an optimal steering path, and providing a steering angle command signal or steering torque command signal in the particular steering system of the vehicle to steer the vehicle along the path.

Figure 1:
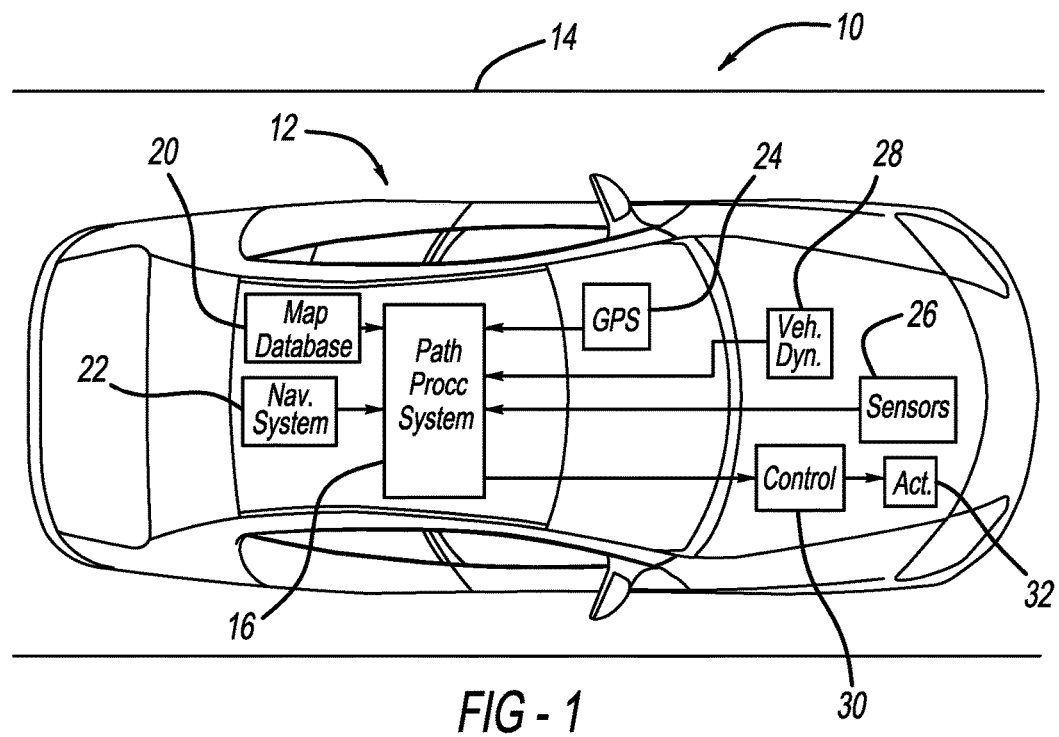
FIG. 1 is an illustration of a vehicle including a path processing system for providing vehicle lateral steering control assist in an autonomously driven or semi-autonomously driven vehicle.

FIG. 1 is an illustration 10 showing a vehicle 12 traveling along a travel lane 14 of a roadway, where the vehicle 12 includes a path processing system 16 that identifies the position of the vehicle 12 relative to the lane 14 and provides vehicle steering commands to maintain the vehicle 12 in the travel lane 14 in any suitable manner as generally or specifically discussed herein. The system 16 is intended to represent all of the various modules, controllers, memories, central processing units (CPUs), processors, electronic control units (ECUs), etc. that are necessary to perform and operate the various algorithms and processes discussed herein. The vehicle 12 also includes a map database 20, a navigation system 22, a GPS unit 24, sensors/detectors 26, a vehicle dynamics module 28 and a vehicle controller 30. The map database 20 stores map information at any level of detail that is available, including specific information about travel lanes, and operates in association with the navigation system 22 to display the various maps and other information that is available. The sensor/detectors 26 are intended to represent any and all object detection sensors or cameras on the vehicle 12, such as forward, rear and side cameras, back-up cameras, lidar sensors, long range radar detectors, short range radar detectors, etc., located in any suitable position on the vehicle 12. For the purposes described herein, the sensors/detectors 26 detect lane markings and other suitable objects that identify the lane 14 that can be used by the system 16 to provide proper steering. The vehicle dynamics module 28 provides vehicle longitudinal and lateral speed, vehicle yaw rate, vehicle longitudinal and lateral acceleration, steering angle, steering torque, etc. The vehicle controller 30 controls the operation of the vehicle 12 including steering, brake, throttle, etc. For steering purposes, the controller 30 may provide torque commands and/or steering angle commands to make corrections between a desired course and a predicted course to steering control actuators 32 that provide one or more of electric power steering (EPS), active front steering (AFS), active rear steering (ARS), differential braking (DB), torque vectoring, etc., all well known to those skilled in the art.

Figure 2:
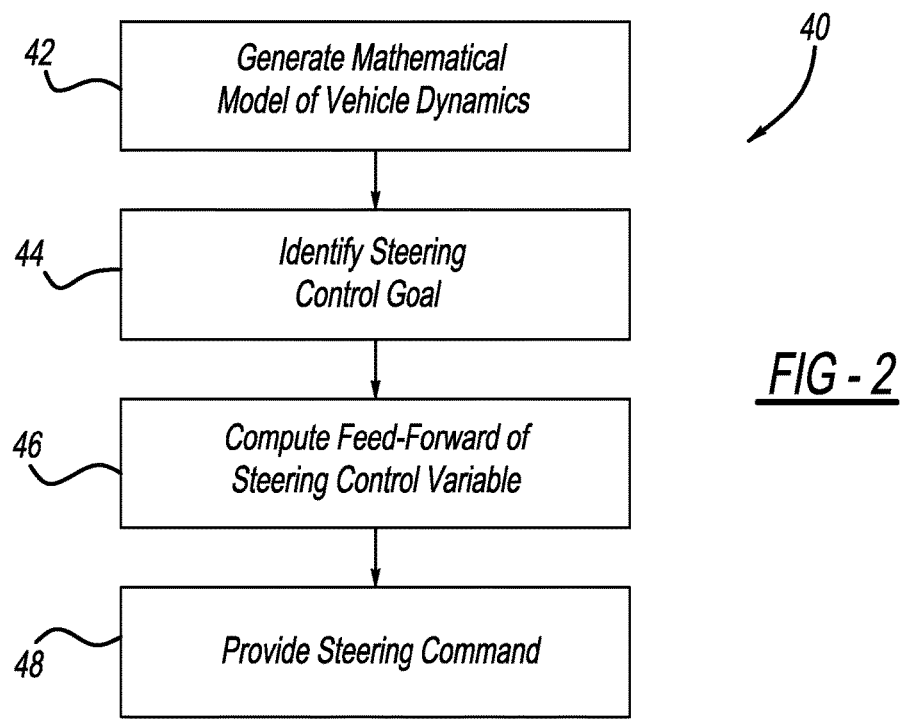
FIG. 2 is a flow chart diagram showing a method for providing the lateral steering control assist of the system shown in FIG. 1.

FIG. 2 is a flow chart diagram 40 showing a process for providing a steering control command to the vehicle controller 30 as determined by the path processing system 16. At box 42, a mathematical model of the vehicle dynamics is generated for model predictive control (MPC), which is a dynamic vehicle model provided through equations of motion and may employ a one-track linear bicycle model coupled with front steering, rear steering, and/or differential braking, and a one-degree of freedom steering column using an EPS. Such a vehicle steering control using MPC may be found in one or more of the references discussed above. As will be discussed in detail below, the one-track linear bicycle model provides four dimensions or parameters, namely, lateral offset $\Delta y$ of the vehicle center of gravity (CG) from the lane 14, vehicle heading angle error $\Delta\Psi$, vehicle lateral velocity $V_y$ and vehicle yaw rate r, and the one-degree of freedom steering column model provides two other dimensions or parameters, namely, steering wheel angle $\phi$ (or pinion angle) and steering wheel angle rotation rate $\dot\phi$.

Figure 3:
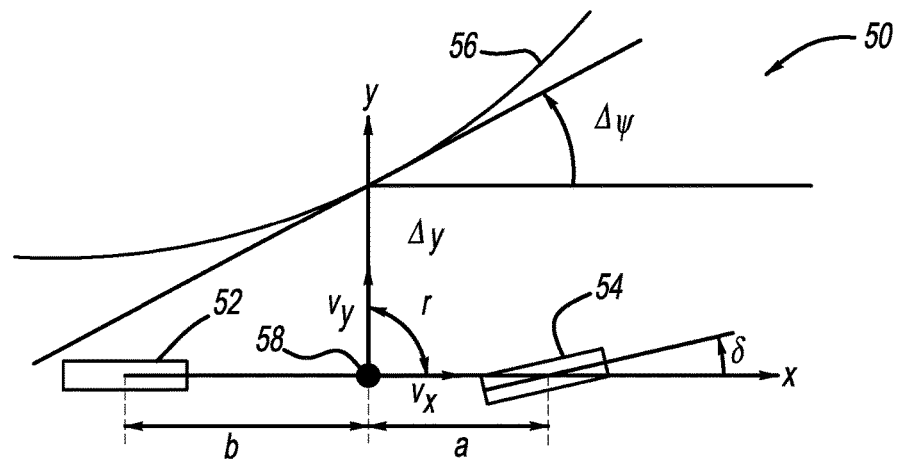
FIG. 3 is an illustration of a one-track linear bicycle model.

In one embodiment, the model is a six-dimensional model including a combination of the one-track bicycle model and the one-degree of freedom steering column model. A one-track linear bicycle model is shown by illustration 50 in FIG. 3 including wheels 52 and 54, vehicle center of gravity 58 and roadway 56, and describes vehicle position with respect to the lane markings of the roadway 56 and clarifies sign convention. The state-space model for vehicle motion includes equations defining relationships of the vehicle 12 to the roadway 56 as:

$$\Delta\dot y = V_x \Delta\Psi + V_y, \qquad (1)$$

$$\Delta\dot\Psi = r - V_x \chi, \qquad (2)$$

and a classical bicycle model for a single track is:

$$\dot{V}_y = -\frac{C_f + C_r}{MV_x}V_y - \left(V_x + \frac{aC_f - bC_r}{MV_x}\right)r + \frac{C_f}{M}\delta_f, \quad (3)$$

$$\dot{r} = \frac{aC_f - bC_r}{I_z V_x}V_y - \frac{a^2C_f + b^2C_r}{I_z V_x}r + \frac{aC_f}{I_z}\delta_f, \quad (4)$$

where $\Delta y$ is the lateral offset of the vehicle center of gravity from the lane (lane offset), $\Delta\Psi$ is the vehicle heading with respect to the lane (lane heading), $V_y$ is the vehicle lateral velocity, r is the vehicle yaw rate, $V_x$ is the vehicle longitudinal velocity, $C_f$ and $C_r$ are the cornering stiffness of the front and rear axles, respectively, a is the distance from the vehicle's center of gravity to the vehicle's front axle, b is the distance from the vehicle's center of gravity to the vehicle's rear axle, M is the mass of the vehicle 12, $I_z$ is the yaw moment of inertial of the vehicle 12, $\chi$ is the path curvature, and $\delta_f$ is the front road wheel angle.

It is assumed that the front and rear axle lateral forces $F_f$ and $F_r$ are linear functions of lateral slip angles as:

$$F_f = C_f a_f, \quad (5)$$

$$F_r = C_r a_r, \quad (6)$$

where $a_f$ and $a_r$ are front and rear slip angles, respectively, and where:

$$\alpha_f = \delta_f - \frac{V_y}{V_x} - \frac{a}{V_x}r, \quad (7)$$

$$\alpha_r = \frac{V_y}{V_x} + \frac{b}{V_x}r. \quad (8)$$

The mathematical model employs a state variable X that is determined depending on whether the EPS uses an EPS angle interface, where the lane position dynamics and the bicycle model are employed, or an EPS torque interface, where the lane position dynamics, the bicycle model and the steering column model are employed. A torque overlay command can be provided to the EPS to add or subtract torque to the steering system in either direction independent of the driver steering input. Also, for the angle interface, the EPS actuator can add or subtract a steering angle in addition to the steering angle provided by the driver, or provide a steering angle independent of the driver. The state variable X for the angle interface embodiment is defined by:

$$X = [\Delta y, \Delta\Psi, V_y, r]^T, \quad (9)$$

and the state variable X for the torque interface embodiment is defined by:

$$X = [\Delta y, \Delta\Psi, V_y, r, \dot{\phi}, \phi]^T \quad (10)$$

The change or derivative of the state variable X is defined as:

$$\dot{X} = AX + BU + h, \quad (11)$$

where U is a steering control variable, such as steering control for total EPS torque, rear steering angle, differential braking, etc., and is an angle for the angle interface and is a torque for the torque interface, and where in the case for combined front steering, differential braking and rear steering, the control variable U for the angle interface is front steer angle, yaw moment and rear steer angle and for the torque interface is front torque, yaw moment and rear steer angle, and h is a road disturbance factor that defines the curvature, bank and slope of the roadway, which for the angle interface embodiment is:

$$h = \begin{bmatrix} 0 \\ -\kappa V_x \\ g\cos\beta\sin\gamma \\ 0 \end{bmatrix}, \quad (12)$$

and for the torque interface embodiment is:

$$h = \begin{bmatrix} 0 \\ -\kappa V_x \\ g\cos\beta\sin\gamma \\ 0 \\ 0 \\ 0 \end{bmatrix}, \quad (13)$$

where $\kappa$ is the road curvature, $\gamma$ is the road bank and $\beta$ is the road slope, and where governing matrices A and B have the following form.

$$A = \begin{bmatrix} 0 & V_x & 1 & 0 & 0 & 0 \\ 0 & 0 & 0 & 1 & 0 & 0 \\ 0 & 0 & a_{11} & a_{12} & 0 & \frac{b_1}{n} \\ 0 & 0 & a_{21} & a_{22} & 0 & \frac{b_2}{n} \\ 0 & 0 & \frac{2D_f}{IV_x} & \frac{2D_f a}{IV_x} & -\frac{c}{I} & -\frac{2D_f}{nI} \\ 0 & 0 & 0 & 0 & 1 & 0 \end{bmatrix}, \quad (14)$$

$$B = \begin{bmatrix} 0 \\ 0 \\ 0 \\ 0 \\ 1/I \\ 0 \end{bmatrix}, \quad (15)$$

$$a_{11} = \frac{C_f + C_r}{MV_x}, \quad (16)$$

$$a_{12} = -V_x - \frac{aC_f - bC_r}{MV_x}, \quad (17)$$

$$a_{21} = -\frac{aC_f - bC_r}{I_z V_x}, \quad (18)$$

$$a_{22} = -\frac{a^2C_f + b^2C_r}{I_z V_x}, \quad (19)$$

$$b_1 = \frac{C_f}{M}, \quad (20)$$

$$b_2 = \frac{aC_f}{I_z}. \quad (21)$$

It is noted that matrix B in equation (15) will have different forms depending on the steering actuator set available, where each column in the matrix defines a control input to a steering actuator. The example given above where the matrix B has one column, the vehicle 12 has front EPS only. If the vehicle 12 has front and rear steering actuators, then the matrix B will have two columns, if the vehicle 12 has front steer and differential braking, then the matrix B will have two columns, and if the vehicle 12 has three actuators for front and rear steering and differential braking, then matrix B will have three columns. It is also noted that instead of the factor h being a curvature term defined as a known disturbance in the '528 application, the factor h is the road disturbance for bank, slope and curvature as defined herein that is provided by cameras, the map database 20, etc.

Once the model is provided, the algorithm identifies a steering control goal at box 44 that minimizes the deviation of the vehicle center of gravity (CG) from the planned or desired path to provide corrected steering. Many algorithms are known in the art to define a desired steering path for collision avoidance purposes. As will be discussed below, the steering control goal obtains the control variable U that minimizes a quadratic cost function J. The planned path (or reference trajectory) of the vehicle 12 at any time instant k is a set of points $r_{k+j}$, $j=1,2,\ldots,p$. Each point $r_{k+j}$ is a two-dimensional vector including the lane lateral position of the vehicle center of gravity, and relative to the vehicle heading angle $\Delta\Psi$. The number of set points p is driven by a prediction horizon $T_p = pT_s$, where $T_s$ is a sampling time. Future outputs of the mathematical model should follow the reference trajectory $r_{k+j}$, or in other words, the cost function J associated with the errors $y_{k+j} - r_{k+j}$, $j=1,2,\ldots,p$ should be minimized from its path in the lane.

Since the state variable $X_k$ for sample time k is known, the problem of finding the optimal steering control variable $U_k$ reduces to finding a global minimum of the quadratic function J in the control variable $U_k$. Such a problem can be solved in a standard quadratic programming manner. A detailed discussion of how the cost function J is minimized can be found in the '528 application, where the cost function J is defined as:

$$J = \int_0^{\Delta T} \left\{ [y \ \varphi]_{err} \cdot Q(t) \cdot \begin{bmatrix} y \\ \varphi \end{bmatrix}_{err} + U \cdot R(t) \cdot u^T \right\} dt, \quad (22)$$

where $y_{err}$ is the lateral offset error ($y_{desired} - y_{predicted}$), $\phi_{err}$ is the heading angle error ($\phi_{desired} - \phi_{predicted}$), and Q(t) is a turning weighting matrix for predicted errors given as:

$$Q = \begin{pmatrix} Q_{lateral} & 0 \\ 0 & Q_{heading} \end{pmatrix}, \quad (23)$$

where $Q_{lateral}$ is the weight associated with lateral error (output), $Q_{heading}$ is the weight associated with heading error (output), and R(t) is the weighting matrix for control actions given as:

$$R = \begin{pmatrix} R_{front} & 0 & 0 \\ 0 & R_{rear} & 0 \\ 0 & 0 & R_{db} \end{pmatrix}, \quad (24)$$

where $R_{front}$ is the weight associated with front steer (input to the controller), $R_{rear}$ is the weight associated with rear steer (input to the controller) and $R_{db}$ is the weight associated with differential braking (input to the control).

At box 46, the algorithm uses the determined future curvature, bank and slope information of the roadway to compute a feed-forward part of the steering control variable U by solving the cost function J of equation (22) discussed above. The algorithm uses the MPC or an optimal linear quadratic (LQ) regulator to determine optimal control variables U for one or more of a front angle overlay or a front torque overlay, a rear steering angle, a yaw moment for differential braking and/or torque vectoring. The algorithm first determines the state variable X and the steering control variable U for stationary motion of the vehicle 12 for a current horizontal curvature, bank and slope of the roadway, where the stationary motion is a circular motion that the vehicle 12 would travel with a constant speed $V_y$, yaw rate r and lateral velocity $V_y$, i.e., the roadway is approximated to a circular track. The dynamic motion of the vehicle 12 is defined by equation (11), and by setting the derivative of the state value X to 0, the steady state or stationary motion of the vehicle 12 can be defined as:

$$AX_{SS} + BU_{SS} + h_{SS} = 0, \quad (25)$$

where the steady state variables $X_{SS}$ and $U_{SS}$ can be obtained analytically using mathematical models or can be measured experimentally, and where the stationary values for circular motion can be defined as:

$$\Delta\gamma = 0, \quad (26)$$

$$\Delta\psi = -V_y V_x, \quad (27)$$

$$V_y = \left(b - \frac{aMV_x^2}{LC_r}\right)\kappa V_x, \quad (28)$$

$$r = \kappa V_x, \quad (29)$$

$$\dot{\varphi} = 0, \quad (30)$$

$$\varphi = \kappa(L + K_{us}V_x^2)SR, \quad (31)$$

where L is the vehicle wheel base, which is a+b, $K_{us}$ is a vehicle understeer gradient, and SR is steering ratio, and where the other variables are defined above.

Once the steady state variables $X_{SS}$ and $U_{SS}$ have been obtained, new state variables $X_1$ and $U_1$ are introduced that describe a deviation of the dynamic motion of the vehicle 12 from the stationary motion, which is linearized around the steady state, where the deviation from the steady state is defined as:

$$X_1 = X - X_{SS}, \quad (32)$$

$$U_1 = U - U_{SS}, \quad (33)$$

and where the dynamic motion having variable velocity $V_x$, yaw rate r and lateral velocity $V_y$ for the actual road geometry is defined as:

$$\dot{X}_1 = AX_1 + BU_1 + h_1, \quad (34)$$

where $h_1 = -\dot{X}_{SS}$.

Figure 4:
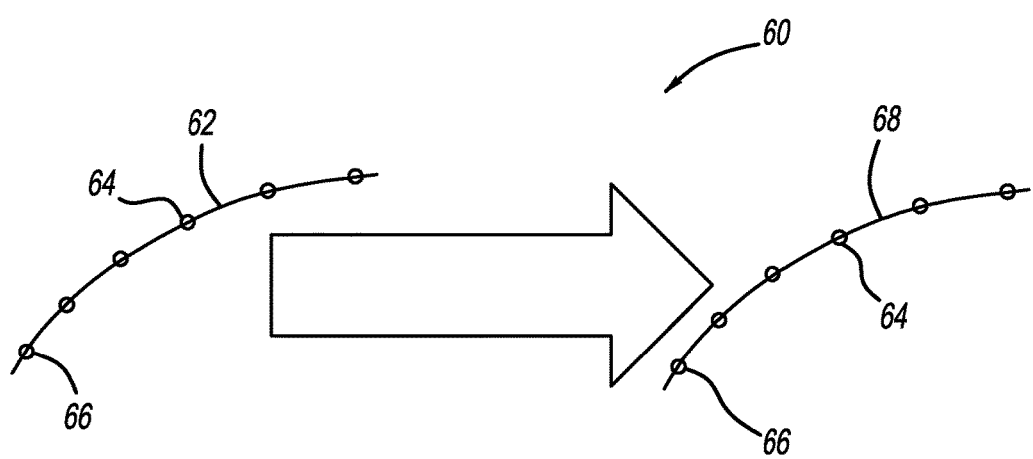
FIG. 4 is an illustration including different sample points along a curved travel lane showing a transformation between steady state control variables and dynamic motion control variables.

This transformation of the state and control variables X and U for the deviation of the dynamic motion from the stationary motion of the vehicle 12 can be described with the help of FIG. 4, which is an illustration 60 showing a curve 62 representing the travel lane that the vehicle 12 is following, where sample point 66 is the current location of the vehicle 12 and has a disturbance factor h(t) for the current curvature, bank and slope of the roadway, where t is time. The curvature, bank and slope of the roadway at sample points 64 for future locations of the vehicle 12 along the curve 62 are defined as $h(t+\tau), h(t+2\tau), \ldots, h(t+n\tau)$, where $\tau$ is the change in time. The state and control variables X and U are transformed to $X_1$ and $U_1$ at each of the sample points 64 illustrated by line 68 for the new disturbance factor $h_1$.

The MPC or LQ control algorithm is then employed using equations with the terms of the new state and control variables $X_1$ and $U_1$. The final expression for the steering control variable $U_k$ is provided as follows, where the final control action is the sum of the feedback and feed-forward terms, and where the feed-forward terms are the sum of the steady-state control value and the planned path related terms so as to consider the roadway curvature, bank and/or slope. Thus, the steering control variable $U_k$ is defined as:

$$U_k = -[\Sigma_{j=1}^{P}[\Sigma_{i=1}^{j}(CA^{i-1}B)^T R_{k+j}(CA^{i-1}B)]+Q_k]^{-1}\Sigma_{j=1}^{P}[\Sigma_{i=1}^{j}(CA^{i-1}B)^T R_{k+j}CA^j]X_k+[\Sigma_{j=1}^{P}[\Sigma_{i=1}^{j}(CA^{i-1}B)^T R_{k+j}(CA^{i-1}B)]+Q_k]^{-1}\Sigma_{j=1}^{P}[\Sigma_{i=1}^{j}(CA^{i-1}B)^T R_{k+j}r_{k+j}-C i=1jAi-1hk+j-i+K_k x_{SS}+U_{SS},$$ (35)

where:

$$-[\Sigma_{j=1}^{P}[\Sigma_{i=1}^{j}(CA^{i-1}B)^T R_{k+j}(CA^{i-1}B)]+Q_k]^{-1}\Sigma_{j=1}^{P}[\Sigma_{i=1}^{j}(CA^{i-1}B)^T R_{k+j}CA^j]X_k,$$ (36)

is the feedback term of the control variable $U_k$, and:

$$\left[\sum_{j=1}^{p}\left[\sum_{i=1}^{j}(CA^{i-1}B)^T R_{k+j}(CA^{i-1}B)\right]+Q_k\right]^{-1}$$ (37)

$$\sum_{j=1}^{p}\left[\sum_{i=1}^{j}(CA^{i-1}B)^T R_{k+j}r_{k+j} - C\sum_{i=1}^{j}A^{i-1}h_{k+j-i}\right]+K_k x_{ss}+U_{ss},$$

is the feed-forward term of the control variable $U_k$, and:

$$C\Sigma_{i=1}^{j}A^{i-1}h_{k+j-i},$$ (38)

is the future curvature, bank and slope information, and:

$$K_k x_{SS}+U_{SS},$$ (39)

is the current steady state curvature, bank and slope information.

At box 48, the algorithm provides the steering command to the controller 30 for either front or rear steering, which may be a torque overlay command for an EPS.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing lateral steering control for an autonomously driven or semi-autonomously driven vehicle traveling along a roadway, said method comprising:

providing a mathematical model of vehicle dynamics that includes a state variable, a steering control variable and a future roadway disturbance factor that defines curvature, bank and/or slope of the roadway, wherein providing a mathematical model includes providing a four-degree of freedom mathematical model or a six-degree of freedom mathematical model where the model uses a one-track bicycle model for the four-degree of freedom mathematical model and uses a combination of a one-track bicycle model and a one-degree of freedom steering model for the six-degree of freedom mathematical model;

determining a steering control goal using the steering control variable that reduces a difference between a current vehicle path and a desired vehicle path;

determining an optimal steering control signal using the mathematical model that provides the steering control goal and that includes a feedback portion and a feed-forward portion, where the feed-forward portion includes the road disturbance factor; and providing the control signal to a steering controller.

2. The method according to claim 1 wherein providing a mathematical model includes using the one-track bicycle model to provide model dimensions of lateral offset $\Delta y$ of a vehicle center of gravity from the desired vehicle path, a vehicle heading angle error $\Delta\psi$, vehicle lateral velocity $\Delta y$ and vehicle yaw rate r, and the one-degree of freedom steering column model to provide steering wheel angle $\phi$ and steering wheel angle rotation rate $\dot\phi$.

3. The method according to claim 2 wherein a derivative of the state variable is defined as:

$$\dot X = AX + BU + h$$

where X is the state variable, U is the steering control variable, h is the road disturbance factor, and A and B are matrices.

4. The method according to claim 3 wherein providing a mathematical model includes defining the state variable X by lane position dynamics and the bicycle model for an angle interface steering control as:

$$X=[\Delta y, \Delta\Psi, V_y, r]^T$$

where the state variable X is a road wheel angle, and defining the state variable X by the lane position dynamics, the bicycle model and the steering model for a torque interface steering control as:

$$X=[\Delta y, \Delta\Psi, V_y, r, \phi, \dot\phi]^T$$

where the state variable X a combined torque command and a road wheel angle.

5. The method according to claim 4 wherein the road disturbance factor h is defined as:

$$h = \begin{bmatrix} 0 \\ -\kappa V_x \\ g\cos\beta\sin\gamma \\ 0 \end{bmatrix}$$

for the angle interface steering control, or by:

$$h = \begin{bmatrix} 0 \\ -\kappa V_x \\ g\cos\beta\sin\gamma \\ 0 \\ 0 \\ 0 \end{bmatrix}$$

for the torque interface steering control, where κ is roadway curvature, γ is roadway bank and β is roadway slope.

6. The method according to claim 1 wherein determining a steering control goal includes defining a relationship between a steering command and a cost function.

7. The method according to claim 6 wherein the cost function is a quadratic function.

8. The method according to claim 7 wherein the quadratic function is defined by the equation:

$$J = \int_0^{\Delta T} \left\{ [y \ \varphi]_{err} \cdot Q(t) \cdot \begin{bmatrix} y \\ \varphi \end{bmatrix}_{err} + U \cdot R(t) \cdot u^T \right\} dt,$$

where J is the cost function, $y_{err}$ is a lateral offset error ($y_{desired} - y_{predicted}$), $\phi_{err}$ is a heading angle error ($\phi_{desired} - \phi_{predicted}$), and Q(t) is a turning weighting matrix for predicted errors given as:

$$Q = \begin{pmatrix} Q_{lateral} & 0 \\ 0 & Q_{heading} \end{pmatrix},$$

where $Q_{lateral}$ is the weight associated with lateral error, $Q_{heading}$ is a weight associated with heading error, and R(t) is a weighting matrix for control actions given as:

$$R = \begin{pmatrix} R_{front} & 0 & 0 \\ 0 & R_{rear} & 0 \\ 0 & 0 & R_{db} \end{pmatrix},$$

where $R_{front}$ is a weight associated with front steer, $R_{rear}$ is a weight associated with rear steer, and $R_{db}$ is a weight associated with differential braking.

9. A method for providing lateral steering control for an autonomously driven or semi-autonomously driven vehicle traveling along a roadway, said method comprising:
  providing a mathematical model of vehicle dynamics that includes a state variable, a steering control variable and a future roadway disturbance factor that defines curvature, bank and/or slope of the roadway;
  determining a steering control goal using the steering control variable that reduces a difference between a current vehicle path and a desired vehicle path;
  determining an optimal steering control signal using the mathematical model that provides the steering control goal and that includes a feedback portion and a feed-forward portion, where the feed-forward portion includes the road disturbance factor, wherein determining a steering control signal includes using the mathematical model to define a state variable and a control variable for a vehicle steady state or stationary motion condition, where the stationary motion has a constant speed, yaw rate and lateral velocity, for a current curvature, bank and slope of the roadway; and
  providing the control signal to a steering controller.

10. The method according to claim 9 wherein determining a steering control signal includes transforming the state variable and the control variable for the vehicle steady state condition by subtracting the state variable and the control variable for the steady state condition from the state variable and the control variable at future sample times to obtain a new state variable and a new control variable for each sample time that provides a deviation of the dynamic motion of the vehicle from the stationary motion.

11. The method according to claim 10 wherein determining a steering control signal includes using model predictive control.

12. The method according to claim 10 wherein determining a steering control signal includes using the equation:

$$U_k = \frac{\sum_{j=1}^{j=p} \left( C_d \sum_{i=1}^{j} A_d^{i-1} B_d \right)^T Q_{k+j} [r_{k+j} - Q_{k+j}[r_{k+j} - C_d A_d^j x_k - C_d \sum_{i=1}^{j} A_d^{i-1} h_k]}{\left( R_k + \sum_{j=1}^{j=p} (C_d \sum_{i=1}^{j} A_d^{i-1} B_d)^T Q_{k+j} (C_d \sum_{i=1}^{j} A_d^{i-1} B_d) \right)}$$

where:

$-[\sum_{j=1}^{P}[\sum_{i=1}^{j}(CA^{i-1}B)^T R_{k+j}(CA^{i-1}B)] + Q_k]^{-1} \sum_{j=1}^{P}[\sum_{i=1}^{j}(CA^{i-1}B)^T R_{k+j} CA^j] X_k,$ is the feedback portion of the steering control variable $U_k$, and:

$[\sum_{j=1}^{P}[\sum_{i=1}^{j}(CA^{i-1}B)^T R_{k+j}(CA^{i-1}B)] + Q_k]^{-1} \sum_{j=1}^{P}[\sum_{i=1}^{j}(CA^{i-1}B)^T R_{k+j} r_{k+j} - C\sum_{i=1}^{j} A^{i-1} h_{k+j-i}] + K_k x_{SS} + U_{SS},$ is the feed-forward portion of the control variable $U_k$, and:

$C\sum_{i=1}^{j} A^{i-1} h_{k+j-i},$ is future curvature, bank and slope information, and:

$K_k x_{SS} + U_{SS},$ is current curvature, bank and slope information, where $A_d$, $B_d$, $C_d$ and $h_k$ are discreet versions of matrices A, B, C and h, respectively, $Q_{k+j}$ is a weight on path tracking error, $R_k$ is a weight on actuator command, and $r_{k+j}$ is a vector of set points.

13. The method according to claim 9 wherein determining a steering control goal includes defining a relationship between a steering command and a cost function.

14. The method according to claim 13 wherein the cost function is a quadratic function.

15. A method for providing lateral steering control for an autonomously driven or semi-autonomously driven vehicle traveling along a roadway, said method comprising:
  providing a four-degree of freedom or a six-degree of freedom mathematical model of vehicle dynamics that includes a state variable, a steering control variable and a future roadway disturbance factor that defines curvature, bank and/or slope of the roadway;
  determining a steering control goal using the steering control variable that reduces a difference between a current vehicle path and a desired vehicle path;
  determining an optimal steering control signal using the mathematical model that provides the steering control goal and that includes a feedback portion and a feed-forward portion, where the feed-forward portion includes the road disturbance factor, wherein determining the steering control signal includes defining a state variable and a control variable for a vehicle steady state or stationary motion condition for a current curvature, bank and slope of the roadway, where the stationary motion has a constant speed, yaw rate and lateral velocity, and transforming the state variable and the control variable for the vehicle steady state condition by subtracting the state variable and the control variable for the steady state condition from the state variable and the control variable at future sample times to obtain a new state variable and a new control variable for each sample time that provides a deviation of the dynamic motion of the vehicle from the stationary motion; and providing the control signal to a steering controller.

16. The method according to claim 15 wherein determining a steering control signal includes using the equation:

$$U_k = \frac{\sum_{j=1}^{j=p}\left(C_d\sum_{i=1}^{j}A_d^{i-1}B_d\right)^T Q_{k+j}[r_{k+j} - C_d A_d^j x_k - C_d \sum_{i=1}^{j} A_d^{i-1} h_k]}{R_k + \sum_{j=1}^{j=p}(C_d\sum_{i=1}^{j}A_d^{i-1}B_d)^T Q_{k+j}(C_d\sum_{i=1}^{j}A_d^{i-1}B_d)}$$

where:

$-[\Sigma_{j=1}^{p}[\Sigma_{i=1}^{j}(CA^{i-1}B)^T R_{k+j}(CA^{i-1}B)]+Q_k]^{-1}\Sigma_{j=1}^{p}[\Sigma_{i=1}^{j}(CA^{i-1}B)^T R_{k+j}CA^j]X_k$, is the feedback portion of the steering control variable $U_k$, and:

$[\Sigma_{j=1}^{p}[\Sigma_{i=1}^{j}(CA^{i-1}B)^T R_{k+j}(CA^{i-1}B)]+Q_k]^{-1}\Sigma_{j=1}^{p}[\Sigma_{i=1}^{j}(CA^{i-1}B)^T R_{k+j}r_{k+j}-C\Sigma_{i=1}^{j}A^{i-1}h_{k+j-i}]+K_px_{SS}+U_{SS}$, is the feed-forward portion of the control variable $U_k$, and:

$C\Sigma_{i=1}^{j}A^{i-1}h_{k+j-i}$, is future curvature, bank and slope information, and:

$K_px_{SS}+U_{SS}$, is current curvature, bank and slope information, where $A_d$, $B_d$, $C_d$ and $h_k$ are discreet versions of matrices A, B, C and h, respectively, $Q_{k+j}$ is a weight on path tracking error, $R_k$ is a weight on actuator command, and $r_{k+j}$ is a vector of set points.

17. The method according to claim 15 wherein providing a mathematical model includes providing a mathematical model that uses a one-track bicycle model for the four-degree of freedom mathematical model and uses a combination of a one-track bicycle model and a one-degree of freedom steering model for the six-degree of freedom mathematical model.

18. The method according to claim 17 wherein providing a mathematical model includes using the one-track bicycle model to provide model dimensions of lateral offset $\Delta y$ of a vehicle center of gravity from the desired vehicle path, a vehicle heading angle error $\Delta \psi$, vehicle lateral velocity $\Delta y$ and vehicle yaw rate r, and the one-degree of freedom steering column model to provide steering wheel angle $\phi$ and steering wheel angle rotation rate $\dot{\phi}$.

19. The method according to claim 18 wherein a derivative of the state variable is defined as:

$\dot{X}=AX+BU+h$ where X is the state variable, U is the steering control variable, h is the road disturbance factor, and A and B are matrices.

20. The method according to claim 19 wherein providing a mathematical model includes defining the state variable X by lane position dynamics and the bicycle model for an angle interface steering control as:

$X=[\Delta y, \Delta \Psi, V_y, r]^T$ where the state variable X is a road wheel angle, and defining the state variable X by the lane position dynamics, the bicycle model and the steering model for a torque interface steering control as:

$X=[\Delta y, \Delta \Psi, V_y, r, \phi, \dot{\phi}]^T$ where the state variable X is a combined torque command and a road wheel angle.

21. The method according to claim 20 wherein the road disturbance factor h is defined as:

$$h = \begin{bmatrix} 0 \\ -\kappa V_x \\ g\cos\beta\sin\gamma \\ 0 \end{bmatrix}$$

for the angle interface steering control or by:

$$h = \begin{bmatrix} 0 \\ -\kappa V_x \\ g\cos\beta\sin\gamma \\ 0 \\ 0 \\ 0 \end{bmatrix}$$

for the torque interface steering control, where $\kappa$ is roadway curvature, $\gamma$ is roadway bank and $\beta$ is roadway slope.

* * * * *